United States Patent

Ross et al.

[15] 3,693,080
[45] Sept. 19, 1972

[54] TIME DOMAIN MEASUREMENT OF HIGH FREQUENCY COMPLEX PERMITTIVITY AND PERMEABILITY OF TRANSMISSION LINE ENCLOSED MATERIAL SAMPLE

[72] Inventors: Gerald F. Ross, Lexington; Alexander M. Nicolson, Concord, both of Mass.

[73] Assignee: Sperry Rand Corporation

[22] Filed: Dec. 21, 1970

[21] Appl. No.: 99,948

[52] U.S. Cl. .................................................. 324/58.5 A
[51] Int. Cl. ..................................................... G01r 27/04
[58] Field of Search .......................... 324/57, 58, 58.5

[56] References Cited

UNITED STATES PATENTS 3,244,975  4/1966  Bauer ........................... 324/52
3,474,337  10/1969  Petrick ..................... 324/58.5 A Primary Examiner—Robert J. Corcoran
Attorney—S. C. Yeaton

[57] ABSTRACT

The forward and back scattered energy of a sample exposed to an incident impulse of electromagnetic energy in a transmission line is sampled by a drift compensated sampling system and the incident wave and reflected and transmitted responses are employed in performing discrete Fourier transformations in a computation process yielding complex permittivity and complex permeability of the material of the sample.

7 Claims, 10 Drawing Figures

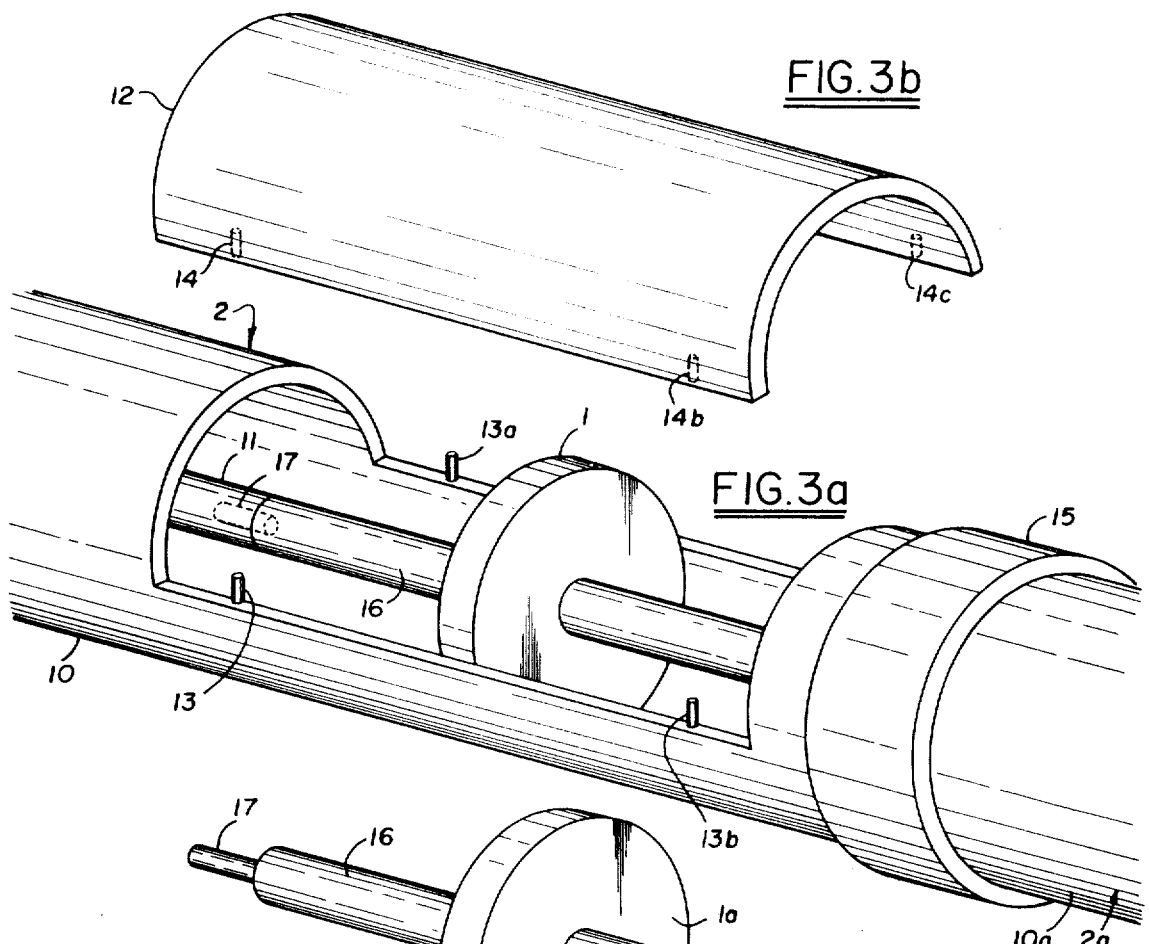
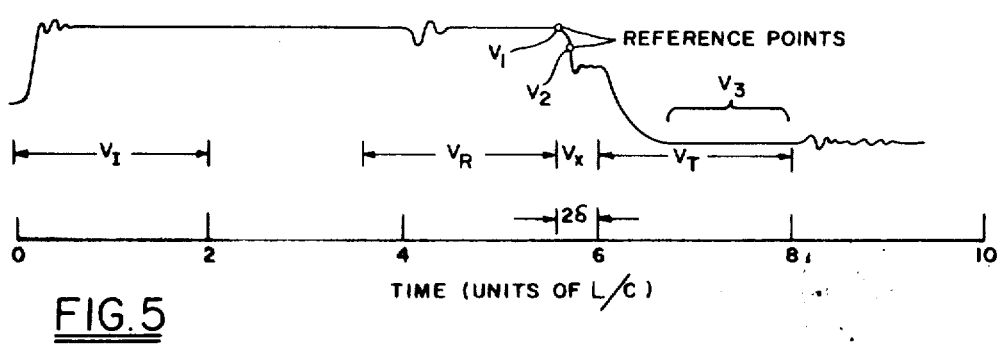

TIME DOMAIN MEASUREMENT OF HIGH FREQUENCY COMPLEX PERMITTIVITY AND PERMEABILITY OF TRANSMISSION LINE ENCLOSED MATERIAL SAMPLE

BACKGROUND OF THE INVENTION

1. Field of the Invention

The invention pertains to apparatus for measuring the high frequency characteristics of materials and more specifically concerns apparatus for the accurate and rapid measurement of the high frequency complex permittivity and complex permeability of materials contemplated for use in high frequency apparatus.

2. Description of the Prior Art

Traditionally, measurements of the complex permeability and complex permittivity of materials have been made at fixed frequencies using relatively narrow band slotted line or impedance bridge systems of the high frequency type. Many time consuming measurements are required to be made with such prior art apparatus in order to span even a relatively narrow frequency range. Prior art methods have been slow and cumbersome, since these measurements have required disconnecting and re-assembling the apparatus for each pair of independent measurements and are not applicable when measurements must be made rapidly over a considerable frequency span. For example, coaxial transmission line systems used previously required disassembly and rearrangement of the coaxial line fixtures between transmission and reflection measurements on the same sample, a procedure which is excessively time consuming and can clearly lead to inaccuracies.

SUMMARY OF THE INVENTION

The present invention is a high frequency or microwave system permitting the rapid and accurate measurement of the complex permittivity and complex permeability of samples of material placed in a transmission line and subjected to an incident impulse of electromagnetic energy. The invention employs a coaxial transmission line configuration that permits simultaneous display on a sampling oscilloscope of a waveform with representations of the incident impulse and its back and forward scattered time domain signatures, the latter being uniquely related to the intrinsic properties of the material under examination.

BRIEF DESCRIPTION OF THE DRAWINGS

FIG. 1b is a signal flow graph employed in explaining the diagram of FIG. 1a.

FIGS. 3a, 3b, and 3c are perspective views of a part of the apparatus of FIG. 2.

FIG. 5 is a graph showing wave forms characteristic of the apparatus of FIG. 4.

DESCRIPTION OF THE PREFERRED EMBODIMENT

According to the present invention, apparatus is provided for the accurate investigation of the complex permeability and permittivity of linear materials at high or microwave frequencies from the forward and back scattering responses of such materials to an impulsive electromagnetic wave form by using time-to-frequency domain processing techniques. In general, the measurement apparatus consists of an arrangement for illuminating a suitably shaped sample of the material to be investigated in a transmission line with an impulse of high frequency energy having a sub-nanosecond rise time. The incident pulse is processed by and may be displayed on a high frequency sampling oscilloscope, and the time-stretched waveform made available by the oscilloscope or other sample and hold device is converted to a digital representation. The latter is read into a suitably programmed general purpose electronic digital computer, where the sampled wave form is converted into its Fourier transform to yield the complex spectrum of the incident impulse.

In a similar manner, the transient waveform reflected or back scattered from the sample under investigation and that transmitted through it or forward scattered are then also successively processed and are displayed by the sampling oscilloscope, are converted into digital data, and are finally subjected to Fourier transformation in the digital computer. With appropriate adjustments to ensure, as will be explained, that the time domain reference is the same for each of the successive measurements, ratios of the reflected wave spectrum to the incident wave spectrum and of the reflected wave spectrum to the transmitted wave spectrum are developed. As will be demonstrated, these ratio values are manipulated so as to yield the respective reflection and transmission scattering coefficients $S_{11}(\omega)$ and $S_{21}(\omega)$ of the material under study. The complex relative permeability $\mu^*$ and permittivity $\epsilon^*$ are then derived.

Figure 1A:
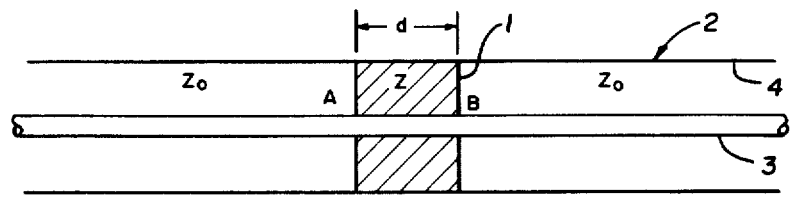
FIG. 1a is a diagram useful in explaining the basis for the invention.
Figure 1B:
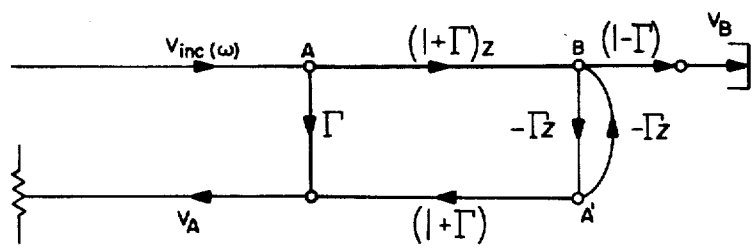

Achievement of an understanding of the principles of the invention is best accomplished by consideration of the following analysis with respect to FIGS. 1a and 1b. First, in terms of the frequency domain, consider an annular disk 1 of material with permeability $\mu = \mu_0 \mu_R$, permittivity $\epsilon = \epsilon_0 \epsilon_R$, and thickness $d$, installed in a coaxial air-filled transmission line with characteristic impedance $Z_0$ having respective inner and outer conductors 3 and 4, as shown in FIG. 1a. Within the region $0 \leq x \leq d$, the transmission line having respective inner and outer conductors 3 and 4 will assume a new characteristic impedance $$Z = \sqrt{\frac{\mu_R}{\epsilon_R}} Z_0$$

where $\mu_R$ and $\epsilon_R$ may be complex. If the value $d$ were infinite, then the reflection coefficient $\Gamma$ of a wave incident on the material at the interface A from the air-filled line would be given by the relation:

$$\Gamma = \frac{Z - Z_0}{Z + Z_0} = \frac{\sqrt{\mu_R/\epsilon_R} - 1}{\sqrt{\mu_R/\epsilon_R} + 1} \quad (1)$$

For finite values of $d$, the transmission coefficient $z$ between faces A and B of disk 1 may be written:

$$z = e^{-j\omega\sqrt{\mu\epsilon}d} = e^{-j(\omega/c)\sqrt{\mu_R\epsilon_R}d} \quad (2)$$

The scattering coefficients $S_{21}$ and $S_{11}$ of the sample disk 1 may be obtained from the flow graph of FIG. 1b in a conventional manner and these are found to be:

$$S_{21}(\omega) = \frac{V_B}{V_{inc}} = \frac{(1+\Gamma)(1-\Gamma)z}{1-\Gamma^2 z^2} = \frac{(1-\Gamma^2)z}{1-\Gamma^2 z^2} \quad (3)$$

$$S_{11}(\omega) = \frac{V_A}{V_{ino}} = \frac{(1-z^2)\Gamma}{1-\Gamma^2 z^2} \quad (4)$$

It is seen that the sums and differences of the scattering coefficients may be written as:

$$\left.\begin{array}{l} V_1 = S_{21} + S_{11} \\ V_2 = S_{21} - S_{11} \end{array}\right\} \quad (5)$$

Setting $$X = (1 - V_1 V_2)/(V_1 - V_2)$$

it can be shown that $\Gamma$ may be obtained from the scattering coefficients, since $$\Gamma = X \pm \sqrt{X^2 - 1} \quad (6)$$

the appropriate sign being chosen so that $|\Gamma| \leq 1$. Also:

$$z = (V_1 - \Gamma)/(1 - V_1\Gamma). \quad (7)$$

Now, from Equation (1), one can define a quantity $c_1$:

$$c_1 = \frac{\mu_R}{\epsilon_R} = \left(\frac{1+\Gamma}{1-\Gamma}\right)^2 \quad (8)$$

From Equation (2), one can define a quantity $c_2$:

$$\mu_R \epsilon_R = -\left(\frac{c}{\omega d} \ln\left(\frac{1}{z}\right)\right)^2 = c_2 \quad (9)$$

Then $$\left.\begin{array}{l} \mu_R = \sqrt{c_1 c_2} \\ \epsilon_R = \sqrt{\dfrac{c_2}{c_1}} \end{array}\right\} \quad (10)$$

Complex permeability and permittivity are thus obtained in a substantially conventional manner in the frequency domain from measurement of the transmission and reflection scattering coefficients of a slab of the material.

As previously noted, the foregoing description discusses measurements of $S_{21}$ and $S_{11}$ in the frequency domain; the objective of the present invention is the derivation of $S_{21}$ and $S_{11}$ by time domain measurements. Measurement is accomplished over broad band widths by taking the Fourier transform of transient responses to a sub-nanosecond pulse. Such a method will be seen to have the advantages of speed and of simplicity of the transmission line part of the measurement system when compared with conventional bridge or slotted-line methods used in the frequency domain and, in addition, can eliminate mismatch errors caused by multiple reflections. A computer-controlled broad band sampling oscilloscope is employed to scan and transmit digitally the transient responses of the microwave sample 1, and then to perform the necessary Fourier transformations and associated computations to obtain $\mu_R$ and $\epsilon_R$.

Figure 2:
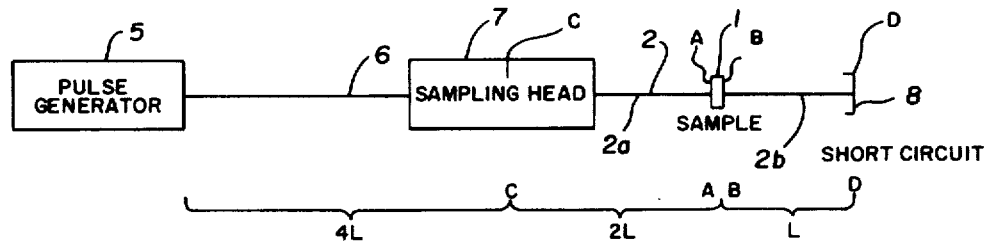
FIG. 2 is a diagram of an embodiment of the invention.

The basic configuration used for time domain measurement according to the present invention is shown in FIG. 2. As will be seen, conventional pulse generator 5 is a device for producing an output pulse typically having a rise time of about 100 picoseconds, which output signal propagates through a transmission line 6 of length 4L to a high frequency sampling head 7 whose actual sampling probe is located at C. Passing through head 7, the pulse travels into a transmission line 2 having respective first and second portions 2a and 2b of respective lengths 2L and L, where 2L and L define the locations A and B in the transmission line of the faces of the disk sample 1 to be investigated. The lengths of the transmission lines 2a and 2b on the respective sides of sample 1 determine a time interval between interfering multiple reflections, and hence the duration of a maximum time domain window in which measurements can conveniently be made. At the distance L from sample 1 is located a short 8 which closes the end of transmission line portion 2b at location D.

It is seen that the pulse from generator 5 propagates down transmission line 6, through the conventional feed-through sampling head 7 of the sampling oscilloscope, and is incident on the sample 1 of material under test. The pulse is partially reflected by and partially transmitted through sample 1. The transmitted pulse reflects from short circuit 8, returns in the line 2 and passes again through the sample 1 on its way back to oscilloscope sampling head 7. It may be shown that the wave forms detected by head 7 will yield the values of $S_{11}(\omega)$ and $S_{21}{}^2(\omega)$. The delay lengths of the respective lines 2 and 6 are chosen to be sufficiently long that, at the sampling head, the incident, reflected, and doubly transmitted transient voltage wave forms do not overlap. Consideration of the lengths shown in FIG. 2 will shown that the reflected and transmitted wave forms each have a time window over which they may be measured uncontaminated by other reflections. For the case illustrated in FIG. 2, the time length of the window is $2L/c$ seconds.

To proceed with the measurement, a metallic shorting plug 1a is installed in the coaxial line with its reflecting face exactly at position A, disk 1 having been removed, and the waveform $V_{SC1}(t-t_0)$ is measured over the appropriate time domain window, where $t_0 = AC/c$. Assuming a perfect short-circuit, $v_{SC1}(t-t_0) = -V_{inc}(t-t_0)$. With no disk 1 in the line 2, the region $d$ being air filled, the waveform $v_{SC2}(t-t_0-2t_0-2\tau)$ is now measured over an appropriate, somewhat later time window, where $t_0 = \overline{BD}/c$ and $\tau = d/c$. Again, assuming a perfect short circuit location at D, $V_{SC2}(t-t_0-2t_0-2\tau) = -V_{inc}(t-t_0-2t_0-2\tau)$. The sample disk is now installed in line 2, with its face again at location A, and two new measurements are made. Over exactly the same time window as for $V_{SC1}$ is measured the reflected wave $V_A(t-t_0) = V_{inc}(t-t_0)*S_{11}(t)$, where * denotes convolution, $S_{11}(t) \xrightarrow{\mathcal{F}} S_{11}(\omega)$ and $\xrightarrow{\mathcal{F}}$ denotes the Fourier transform. Over exactly the same window as for $V_{SC2}$, there is next measured $V_B(t-t_0-2t_0)*S_{12}(t)$, where $S_{12}(t) \xrightarrow{\mathcal{F}} S_{12}(\omega)$ and the convolution occurs because of the passage of the transmitted waveform $V_B(t)$ again through the sample. Now $V_B(t-t_0-2\tau_0) = V_{inc}(t-t_0-2t_0)*S_{21}(t)$.

As previously noted, each of the four measured wave forms is passed through an analog-to-digital converter and is read into a general purpose computer, where a discrete Fourier transformation is performed. By taking the ratios of the appropriate pairs of these transformations, there is then obtained:

$$\frac{F(V_A(t-t_0))}{F(V_{SC1}(t-t_0))} = \frac{F(V_{inc}(t-t_0)) * S_{11}(t)}{F(V_{inc}(t-t_0))}$$

and $$= -S_{11}(\omega) \qquad (11)$$

$$\frac{F(V_B(t-t_0-2\hat{t}_0)) * S_{12}(t)}{F(V_{inc}(t-t_0-2\hat{t}_0))}$$

$$= \frac{F(V_{inc}(t-t_0-2\hat{t}_0)) * S_{21}(t) * S_{12}(t)}{e^{-j2\omega\tau}F(V_{inc}(t-t_0-2\hat{t}_0))}$$

$$= S_{21}(\omega) \cdot S_{12}(\omega) \cdot e^{j2\omega\tau} \qquad (12)$$

Since the sample 1 is reciprocal, $S_{21}(\omega) = S_{12}(\omega)$. The phase factor in Equation (12) requires only a knowledge of the sample thickness $d$. Thus, the ratios of the reflected spectra and the transmitted spectra, with the latter multiplied by $e^{-j2\omega\tau}$, yields $S_{11}(\omega)$ and $S_{21}^2(\omega)$, respectively. Note that even if the transmissions lines 2 and 6 are not lossless, the transient responses are normalized to effective incident pulses which have traversed the same lengths of line, and no error results.

It is evident by inspection of the foregoing analysis that the solution of the equations, such as Equations (11) and (12) thereby generated may be accomplished by any of several known methods, including the use of a cooperative assembly of known analog or digital data processing or computing circuits. For example, the several equations involve simple arithmetic operations such as addition, subtraction, multiplication, and division. Many examples of both analog and digital computation elements are available in the prior art for accomplishing computer operations and it is well known that they may readily be coupled together in cooperative relation for attaining desired results. It is furthermore evident that a conventional general purpose digital or analog computer may be employed for the purpose. It is obviously well within the ordinary skill of digital computer programmers to process the equations discussed above, to create flow charts, and to translate the latter into computer routines and sub-routines for solution of such equations along with a compatible computer language for processing input data and instructions to produce outputs directly useful for application, for example, in a standard display.

As has been observed in the foregoing, the material sample holder used in transmission line 2 must first be used to make measurements with a short circuit in place, and is then used with the sample disk 1 in place. A suitable arrangement for permitting ready exchange of the short circuit and sample disk elements is shown in FIGS. 3a, 3b, and 3c. As is seen particularly in FIG. 3a, the sample holder comprises coaxial line 2 having an outer conductor 10 and an inner conductor 11. An arcuate segment 12 of the outer conductor 10 which has been lifted out of the latter in FIG. 3a is seen at 12 in FIG. 3b. In use, segment 12 becomes an integral part of outer conductor 10, being held in position, as by locating pins 13, 13a, and 13b and pin 13c (not shown), which pins fit cooperatively within corresponding locating pin holes 14, 14a, 14b, and 14c placed correspondingly along the straight edges of segment 12.

The sample holder of FIG. 3a is equipped with an inner conductor 16 supplied at each of its ends, as is seen more fully in FIG. 3c, with locating pins 17 and 17a. Pin 13 fits within a bore centrally located at the end of inner conductor 11; pin 17a is similarly located within a bore in the center conductor (not seen) associated with outer conductor 10a of the coaxial line extension 2a. Thus inner conductor 16 is supported coaxially within outer conductor 10.

As seen in FIG. 3a, inner conductor 16 is equipped with a disk 1 of material whose permeability and permittivity are to be examined. Disk 1 has substantially parallel sides, fits closely over inner conductor 16, and has an outer diameter substantially matching the inner diameter of the coaxial outer conductor 10. A similar arrangement is seen in FIG. 3c, where disk 1a is now made of a high frequency current conductive material, so that disk 1a may act as a reflecting short. FIG. 3a shows coaxial line 2 coupled by a conventional fastener or coupler to coaxial line extension 2a. The sample disk 1, and inner conductor 16 supporting it, is readily withdrawn from the holder by raising sector 12 and by unfastening coupler 15 so that extension 2a may be withdrawn. Such withdrawal removes the support within the holder of inner conductor 16 and the latter and sample disk 1 may then easily be removed from the holder. The reverse process may be used to reinsert an inner conductor 16, for example, with the short circuiting disk 1a mounted on it, or inner conductor 16 when supporting a disk 1 of a sample to be examined. Disks 1 or 1a are accurately located within the transmission line by use, for example, of a gauge block prior to repositioning sector 12.

Figure 4:
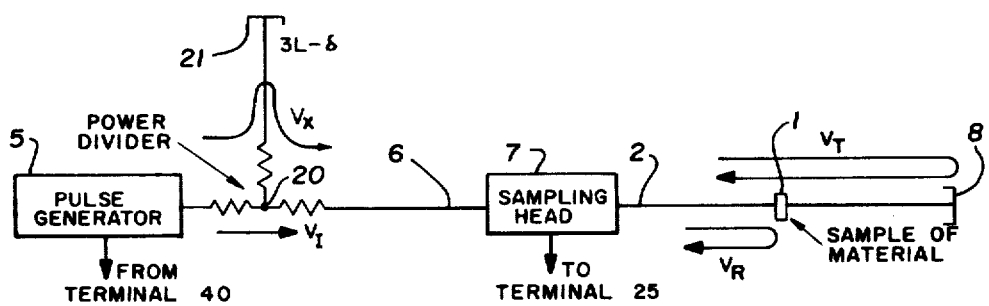
FIG. 4 is a diagram of a preferred form of the invention.
Figure 6:
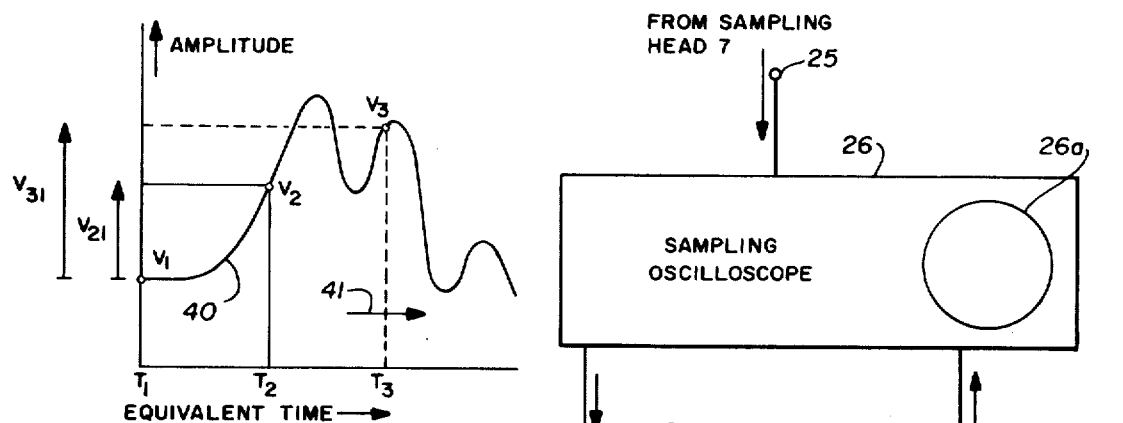
FIG. 6 is a graph of an explanatory waveform.

An embodiment of the invention using the concepts above-described will be considered in connection with FIGS. 4, 5, and 6. Such apparatus is designed to remove potential errors due to amplitude drifts in the measured waveforms and due to small timing drifts between the windows used to measure, for example, the reflected wave from a sample, and that from the substituted short circuit. The latter problem is overcome by use of a triple point scanning technique yet to be discussed.

Figure 7:
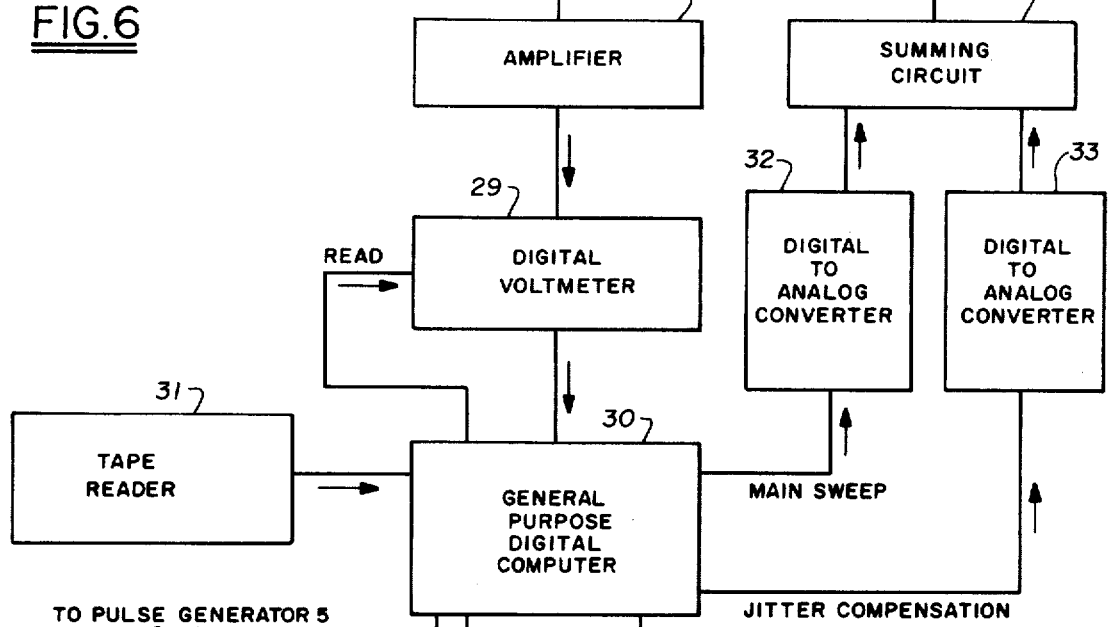
FIG. 7 is a block diagram of apparatus used in connection with that of FIG. 4.

Referring particularly to FIG. 4, the apparatus includes the pulse generator 5 supplied with synchronizing signals from computer 30 of FIG. 7 via terminal 40, sampling head 7, the sample 1 and its holder as seen in FIGS. 3a, 3b, and 3c, short circuit 8, and transmission lines 2 and 6. In addition, there is interposed between pulse generator 5 and sampling head 7 a triple-port power divider 20 of conventional type, which may be resistive in nature, and which has its branching transmission line port short circuited at 21 a distance $3L-\delta$ from the divider junction for purposes yet to be described. It is understood that the junction interior of divider 20 is located a distance $4L$ from the probe of sampling head 7. In FIG. 4, pulse generator 5 may be a conventional pulse source available on the market for the generation of short rise time impulses, or such as may employ a solenoid-driven mercury switch of the kind described in the G. F. Ross et al. U.S. Pat. application Ser. No. 843,945, filed July 23, 1969, for a "High Frequency Switch" now U.S. Pat. No. 3,569,877, issued Mar. 9, 1971, or in the H. C. Maguire U.S. patent application Ser. No. 852,656 filed Aug. 25, 1969, for a "Coaxial Line Reed Switch Fast Rise Time Signal Generator with Attenuation Means Forming Outer Section of Line," now U.S. Pat. No. 3,564,277, issued Feb. 16, 1971, both assigned to the Sperry Rand Corporation. The apparatus of FIG. 4 is otherwise similar to that of FIG. 2, and the sampling head 7 supplies signals to be measured to terminal 25 of the system of FIG. 7.

In FIG. 7, terminal 25 represents the data input connection to an externally synchronized sampling oscilloscope 25, which may be supplied with a cathode ray tube indicator 26a. The sampled output from oscilloscope 26 is supplied through conventional amplifier 27, if amplification is desired, to a conventional digital voltmeter 29, wherein the analog signals supplied by oscilloscope 26 are converted to the digital representations required for manipulation within the conventional general purpose digital computer 30. Oscilloscope 26 may be internally controlled or computer 30 may be used to control the reading out of conventional digital voltmeter 29 and likewise to synchronize the timing and operation of sampling oscilloscope 26. For the latter purpose, main sweep signals for use in oscilloscope 26 are generated by computer 30 and are supplied through conventional digital-to-analog converter 32 to the sweep circuits of oscilloscope 26. Likewise, sweep jitter compensation signals originate in the general purpose computer 30. These are processed by conventional digital-to-analog converter 33, after which they are added to the main sweep signals in conventional summing circuit 34 for application within sampling oscilloscope 26. For the purpose of simultaneous reduction of additive voltage drift and timing shifts, oscilloscope 26 employs a triple-point scanning operation. Instead of a common saw tooth wave sweep, the $x$-coordinate deflection of the cathode ray beam of sampling oscilloscope 26 is driven in discrete steps to form a staircase wave by general purpose digital computer 30.

Operation of computer 30 may be controlled by a program stored within an interior memory system or as shown in FIG. 7, the operating program may be punched or otherwise applied to tape for processing by conventional tape reader 31 and thereby supplied to computer 30. The program, as noted before, may be designed to determine, in a conventional manner, the internal operation of computer 30, as well as the operation of oscilloscope 26 and the triggering of pulse 5 of FIG. 4. Output signals derived by computer 30 are converted to analog voltages by conventional digital-to-analog converters 35 and 36 for supply to the respective $x$ and $y$ deflection plates of cathode ray indicator tube 37a of conventional display 37.

Sampling oscilloscope 26 may be a conventional apparatus wherein a sampling gate is adapted to be scanned continuously across successive repetitions of a repetitive wave form and is then returned to an initial position for recycling. Such sampling oscilloscopes have been employed in the past in the study of the impulse properties of high frequency circuits and have proven to be a valuable tool in such investigations. In using such devices, the effects of short term random fluctuations of the amplitude and timing of the wave forms passed through the high frequency circuit under study are successfully reduced by making repeated scans of the waveform, thereby averaging the random fluctuation signals to zero. However, there may be present long term amplitude drifts of the type present where high gain, wide band amplification circuits are required for proper application of the sampling system. Such long term amplitude and timing drifts are preferably eliminated in the present apparatus by employing an advanced type of sampling oscilloscope system providing means for compensating for long term amplitude and time drifts. A preferred sampling oscilloscope system is the subject of the A.M.Nicolson U.S. patent application Ser. No. 844,021 for a "Method and Means for Compensating Amplitude and Time Drifts in Sampling Wave Form Systems," filed July 23, 1969 issued as U.S. Pat. No. 3,584,309 June 8, 1971, and assigned to the Sperry Rand Corporation.

An improved sampling oscilloscope system such as the Nicolson device, under control of the general purpose digital computer 30, is preferably used in the system of FIG. 7. The sampling oscilloscope 26 provides means for obtaining a first sampling of the magnitude of a waveform at time $T_1$ as illustrated in FIG. 6, which time is established with respect to a time base provided by the general purpose computer 30 and synchronized to the wave form under study. This first sample $V_1$ is taken at time $T_1$ on the curve of FIG. 6 on a portion of the wave having a zero slope. Because it has zero slope, the magnitude of the sample obtained is seen to be substantially unaffected by any timing drifts present in the system. It is recognized, however, that the amplitude $V_1$ will be adversely affected by amplitude drifts of the system.

Sampling oscilloscope 26 also obtains a second sample $V_2$ of the waveform. This is taken with respect to the time base on a portion of the waveform having a slope of relatively large magnitude with respect to the zero slope of the first sample. The second sample $V_2$ magnitude thus obtained is clearly affected by the time drifts of the system and is, furthermore, significantly affected also by system amplitude drifts to the same degree as is affected the magnitude of the first sample. Means provided within sampling oscilloscope 26 measures the difference in magnitudes of the waveform obtained at the two successive sampling times and this magnitude is stored, thereby providing a reference magnitude related solely to the timing of the system, by which reference subsequently occurring time drifts may be compensated.

Thus, prior to obtaining each subsequent sampling of the waveform, amplitude samples of the wave are obtained at the two reference sampling times and the difference is obtained between the sampled magnitudes, which difference is then compared to the stored reference. The error signal provided thereby is related to the time drift of the system and is used to compensate the sampling time of the associated subsequent sample of the waveform. Each subsequent sample is compensated for amplitude drifts by subtracting the magnitude of the waveform obtained at the associated zero slope of the sampling time from the magnitude obtained during the sampling time at which the subsequent sample was taken. The timing drift error signal obtained during a sampling cycle is also used to compensate the two reference sampled times of the next following cycle.

In FIG. 6, a purely abstract wave form 40 is illustrated, waveform 40 being subject to long term amplitude drifts and also to timing drifts which together may cause the waveform 40 to move with respect to the coordinate axes illustrated. Sampling oscilloscope 26 is employed to compensate the effects of such amplitude or time drifts by sampling the voltages $V_1$ and $V_2$ at the sampling times $T_1$ and $T_2$, respectively. The sampling time $T_1$ is chosen to occur at a portion of wave 40 having a zero slope, while the sampling time $T_2$ of the wave 40 is selected to occur where the waveform has a relatively large slope. At the onset of operation of the system, the sampled voltages $V_1$ and $V_2$ are measured and a difference therebetween is stored. This initial difference between voltages $V_2$ and $V_1$ may be designated as $(V_2-V_1)_0$. Voltage $V_2$ varies as a function of both amplitude and time drift, while voltage $V_1$ varies as a function of amplitude drift alone. Accordingly, the quantity $(V_2-V_1)$ is representative solely of the timing drift of the system. The difference, therefore, between quantity $(V_2-V_1)$, when measured at a time subsequent to the initial time, and the stored quantity $(V_2-V_1)_0$, is representative of any timing drift that has occurred between the initial time and the time the measurement was taken. A quantity related to this timing drift error may be combined with the sampling times $T_1$ and $T_2$ in such a way as to shift $T_1$ and $T_2$ back or forward to the points on waveform 40 originally sampled at the initial time, thereby compensating the sampling system for timing drift.

A point $V_3$ of waveform 40 subsequently sampled at sampling time $T_3$ is incrementally advanced as in conventional sampling oscilloscope practice from the left to the right across waveform 40 as indicated by arrow 41. Prior to obtaining each of the $V_3$ samples, a measurement of the quantity $(V_2-V_1)$ is obtained and is compared to the stored quantity $(V_2-V_1)_0$. The error signal derived by the comparison operation is used to compensate the sampling time $T_3$. This timing drift error signal is also employed to compensate the sampling times $T_1$ and $T_2$ of the next obtained timing reference samples. Thus, it is seen that the timing of the sampling system is continuously adjusted to follow timing drifts of waveform 10 to the right or to the left.

Sampling oscilloscope 26, as noted above, incorporates a further compensating feature. In order to compensate the samples for upward or downward amplitude drifts of waveform 40, a voltage sample $V_1$ associated with a voltage sample $V_3$ is subtracted therefrom, providing a quantity which may be designated as $(V_3-V_1)$. Since the voltage values $V_1$ and $V_3$ vary to the same extent with respect to each other due to amplitude drifts of waveform 40, the quantity $(V_3-V_{1b})$ represents a sample compensated for amplitude drifts of the system.

It will be appreciated that the general character of FIG. 6 waveforms capable of being processed by the improved sampling oscilloscope 26 of FIG. 7 and its associated apparatus have been discussed with a view of describing the preferred high frequency apparatus of FIG. 4 with relation to production thereby of the waveform of FIG. 5. The latter waveform must provide reference sample points of character such as those at sampling times $T_1$ and $T_2$ of FIG. 6. Referring to FIGS. 4 and 5, sampling head 7, over the course of a sampling event, sees an incident wave $V_1$ coming from pulse generator 5 and also waves from several passive or reflecting sources. The wave $V_r$ is injected into the measurement system due to the presence of power divider 20 with its port closed by the short circuit 21. Sampling head 7 also sees a wave $V_R$ reflected from the sample 1 under test or by the calibrating short 1a. If sample 1 is present rather than short 1a, head 7 also sees a reflected wave $V_T$ from short circuit 8. Recalling to mind the electrical lengths of the lines between elements of the test circuit, as seen in FIGS. 2 and 4, it will be seen that the wave amplitude sensed by the probe of sampling head 7 has the time characteristic shown in FIG. 5, assuming $V_R$ to be small. The wave $V_r$ generated by the shorted power divider 20 is adjusted to occur just between the end of the reflected voltage wave and the start of a transmitted voltage wave. It produces a considerable perturbation in the signal amplitude sensed by sampling head 7 but, more important, produces in the time era $2\delta$, a reference point $V_1$ in a zero slope portion of the wave analogous to point $V_1$ at time $T_1$ in FIG. 6. Further, a reference point $V_2$ in a large finite slope portion of the wave is also produced, it being analogous to the finite slope point $V_2$ at time $T_2$ in the arbitrary wave 40 of FIG. 6. Oscilloscope 26 thus receives the sampled voltage amplitudes $V_1$ and $V_2$ at respective sampling times $T_1$ and $T_2$ for drift correction purposes, and may then make a voltage $V_3$ sampling a time incrementally shiftable along the window or time era surrounding time $T_3$. Repeated measurements may be made sequentially at the three points within the operating time window.

In the manner previously described in the derivation of Equations (11) and (12), each of four measured waveforms is sampled by the sampling oscilloscope 26 and is passed upon computer command into general purpose computer 30 to be stored and averaged, having been subjected to analog-to-digital conversion by digital voltmeter 29. Discrete Fourier transformations are accomplished by computer 30 in a conventional manner under control of the program supplied, for example, by tape reader 31. The computer then performs the conventional arithmetic steps implied by Equations (11) and (12) for generation of the respective quantities $S_{11}(\omega)$ and $S_{21}(\omega)$. These quantities may be displayed in a conventional way on indicator 37 after conversion into analog voltages $x$ and $y$ by the respective converters 35 and 36. It is apparent that display 37 may in this manner provide on a cathode ray indicator 37a a graphical presentation of an accumulation of measurements or may provide a printed read out of the computed results. Alternatively, the output of the sampling oscilloscope 26 may be recorded on magnetic tape for shipment to a remotely located data processing center.

In an alternative form of the embodiment of FIG. 4, two power dividers such as 20 and associated stub transmission lines such as 21 may be used, one closely following the other between pulse generator 5 and line 6. The first stub again has a length $3L-\delta$, while the second, immediately following the first (with its own power divider), is of length substantially $2L-2\delta$. This arrangement creates a second sloping region such as that providing reference $V_2$ in FIG. 5 just before the start of the $V_R$ window of FIG. 5. In this arrangement, measurements are taken over the transmission or forward scattering window $V_T$ by using first and second amplitude reference values as before, being chosen at positions between the $V_R$ and $V_T$ windows. However, for measurement over the reflection or backward scattering window $V_R$, the amplitude reference values are chosen at positions on the slope introduced just before the beginning of the $V_R$ window.

The invention is thus a method of rapid measurement of the complex permeability and complex permittivity of materials over broad frequency ranges from their time domain transient forward and backward responses. Demonstrated repeatability of results is within ±0.1 increasing to a bound of about ±0.5 for permittivities between 12 and 15. Measurements of samples are made quickly and accurately, since the sample holder requires no rearrangement between transmission and reflection measurements on a given sample, a prior art procedure which is excessively time consuming. The arrangement also permits simultaneous display on a high frequency sampling oscilloscope of a waveform with segments of the display representing the incident pulse, its reflected transient response, and its transmitted transient response.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. Apparatus for measuring the high frequency permittivity and permeability characteristics of a transmission line-enclosed sample of material comprising:
   impulse wave generator means for exciting said transmission line for generating in the presence of said sample corresponding forward and backward scattered waves,
   reflector means for reflecting said forward scattered wave through said sample of material,
   wave sampling means coupled to said transmission line between said impulse wave generator means and said sample of material,
   wave sample-and-hold means for controlling said wave sampling means and for holding representations of said impulse wave, said forward scattered wave, and said backward scattered wave,
   general purpose computing means responsive to said wave sample-and-hold means adapted to be programmed to compute said high frequency characteristics in response to said held wave representations, and
   display means responsive to said computing means for displaying said high frequency characteristics when computed.

2. Apparatus as described in claim 1 wherein the transmission propagation times between said impulse wave generator means and said wave sampling means, between said wave sampling means and the mid-point of said sample of material, and between the mid-point of said sample of material and said reflecting means are substantially in the ratio of 4 to 2 to 1.

3. Apparatus as described in claim 1 wherein said transmission line, in the vicinity of said sample of material comprises coaxial transmission line means having:
   an outer conductor portion having a removable sector, and
   a removable inner conductor portion,
   said inner and outer conductor portions cooperatively supporting said sample of material when in place in said transmission line, and
   said sample of material being in the form of an apertured disk having substantially parallel sides.

4. Apparatus as described in claim 1 wherein said general purpose computing means is adapted to be programmed for:
   digitizing said held wave representations of said impulse wave, of said forward scattered wave, and of said backward scattered wave,
   performing discrete Fourier transforms on said representations,
   computing from said Fourier transforms the respective reflection and transmission scattering coefficients of said material, and
   computing from said scattering coefficients said permittivity and permeability characteristics of said material.

5. Apparatus for measuring the high frequency permittivity and permeability characteristics of a transmission line enclosed sample of material comprising:
   impulse wave generator means for exciting said transmission line,
   branching power dividing means having an interior junction with said transmission line responsive to said impulse wave generator means for combining said impulse wave with a delayed version of said impulse wave for forming a modified wave having first and second amplitude values,
   said first value characterizing a substantially zero slope portion of said modified wave,
   said second value characterizing a portion of said wave having a slope substantially greater than zero,
   said modified wave interacting with said sample of material for generating forward scattered waves,
   means for reflecting said forward scattered wave through said sample of material,
   wave sampling means coupled to said transmission line between said power divider means and said sample of material,
   wave sample-and-hold means for sampling and holding representations of said impulse wave, of said forward scattered wave, and of said backward scattered wave and utilizing said first and second reference amplitude values for compensating said wave sample-and-hold means for substantially eliminating the effects therein of drift,
   general purpose computer means for subjecting said sampled and held representations of said impulse, of said forward scattered wave, and of said backward scattered wave to respective discrete Fourier transformations and for calculating measures of said characteristics from said Fourier transformations.

6. Apparatus as described in claim 5 wherein said branching power dividing means includes a branching transmission line connected at said interior junction and shorted at its end opposite to said junction.

7. Apparatus as described in claim 6 wherein the respective transmission propagation times between said interior junction and said short of said shorted branch of said power divider, between said interior junction of said power divider and said wave sampling means, between said wave sampling means and the mid-point of said sample of material, and between the mid-point of said sample of material and said reflecting means are substantially in the ratio of 3 to 4 to 2 to 1.

* * * * *